United States Patent [19]

Kawai et al.

[11] 4,334,422

[45] Jun. 15, 1982

[54] KNOCK DETECTING APPARATUS

[75] Inventors: Hisasi Kawai, Toyohashi; Hidetaka Nohira, Mishima; Kunimasa Yoshimura, Susono, all of Japan

[73] Assignees: Nippon Soken, Inc., Nishio; Toyota Jidosha Kogyo Kabushiki Kaisha, Toyota, both of Japan

[21] Appl. No.: 203,571

[22] Filed: Nov. 5, 1980

[30] Foreign Application Priority Data

Nov. 9, 1979 [JP] Japan .............................. 54-145803

[51] Int. Cl.³ .......................................... G01L 23/22
[52] U.S. Cl. .................................... 73/35; 364/431.08
[58] Field of Search .................... 73/35; 123/425, 435; 364/550, 551, 506, 431.08

[56] References Cited

U.S. PATENT DOCUMENTS

4,002,155  1/1977  Harned et al. ........................... 73/35
4,271,469  6/1981  Kawai et al. .................... 364/431.08
4,289,102  9/1981  Katsumata et al. ................. 123/425

Primary Examiner—James J. Gill
Attorney, Agent, or Firm—Cushman, Darby & Cushman

[57] ABSTRACT

An apparatus for detecting knock for an internal combustion engine having a plurality of cylinders in which a vibration sensor is attached to each cylinder and a peak value of vibration detected by the sensor is sampled over a predetermined range near the top dead center. The sampled value is converted from analog to digital and stored for a predetermined number of sampling times to obtain the average value for each cylinder. Then the frequency of occurrences in which the ratio between the sampled peak value and the average value exceeds a reference value is obtained, and the knock is determined when the frequency of occurrences in any one cylinder exceeds a predetermined value or when the average frequency of occurrences of the all cylinders exceeds another predetermined value.

2 Claims, 12 Drawing Figures

KNOCK DETECTING APPARATUS

BACKGROUND OF THE INVENTION

1. Field of the Invention

The present invention relates to a knock detecting apparatus for detecting the presence or absence of knock in internal combustion engines (hereinafter referred to as engines).

2. Decription of the Prior Art

In the past, many different types of knock detecting apparatus have been proposed in which the presence of knock in an engine is determined by sensing engine vibration sound, mechanical vibration accelerations or vibrations due to cylinder combustion pressures and by determining the presence of knock in accordance with the resulting output signal. However, none of these apparatus has been considered to be relatively free from errors due to aging, etc., and capable of accurately detecting the presence of engine knock.

SUMMARY OF THE INVENTION

It is the object of the present invention to provide an improved knock detecting apparatus which is capable of accurately determining the presence of engine knock without being affected by aging, noise and the like.

Thus, the apparatus of this invention has among its advantages the fact that by detecting the vibrations induced by combustion phenomena of an engine, extracting from the resulting detection signal the output generated in a predetermined time interval at around the top dead center, storing such extracted output a predetermined number of times, computing the average value of the stored output values, determining that there exists knocking when the proportion of those extracted outputs whose ratio to the said average value is greater than a predetermined value is in excess of a predetermined value and then generating an output, it is possible to accurately detect the presence of knock statistically practically without being affected by engine speed and load, aging, noise and the like.

Another advantage is that by detecting the combustion pressure vibrations of each cylinder in a multi-cylinder engine and by selecting the frequency outputs of over several kHz from the combustion pressure vibration outputs of each cylinder to detect the knock induced vibrations, it is possible to detect the presence of knock in each of the engine cylinders.

DESCRIPTION OF THE PREFERRED EMBODIMENTS

Figure 1:
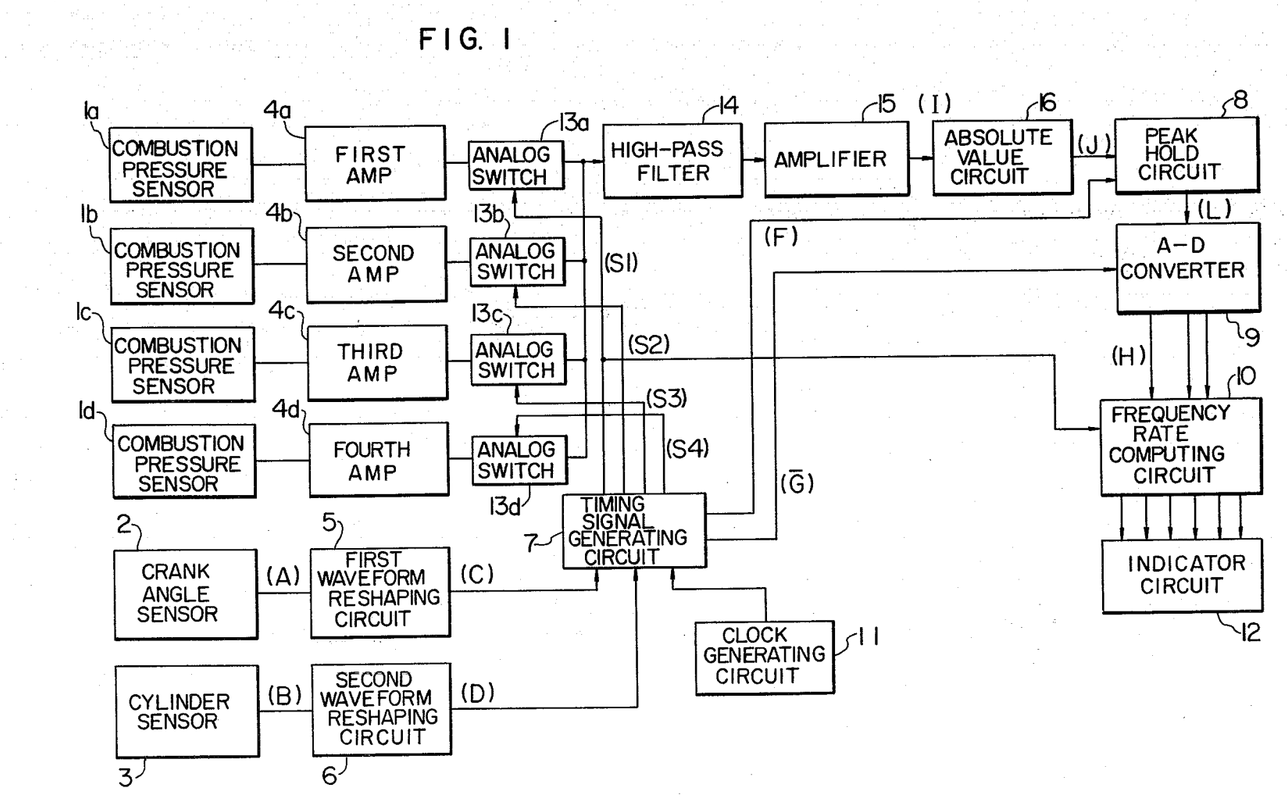
FIG. 1 is a block diagram showing an embodiment of an apparatus according to the invention.

Referring now to FIG. 1 showing an embodiment of an apparatus according to the invention, the embodiment which is applied to an in-line four-cylinder engine, is adapted for detecting the vibrations due to the internal pressures of an engine. In the Figure, numerals $1a$ to $1d$ designate combustion pressure sensors each comprising a piezoelectric element which is in the form of a spark plug washer, and each of the sensors is mounted, along with one of the spark plugs, in the engine, that is, the sensor $1a$ with the No. 1 cylinder spark plug, the sensor $1b$ and the No. 2 cylinder spark plug, the sensor $1c$ with the No. 3 cylinder spark plug, and the sensor $1d$ with the No. 4 cylinder spark plug.

Figure 2:
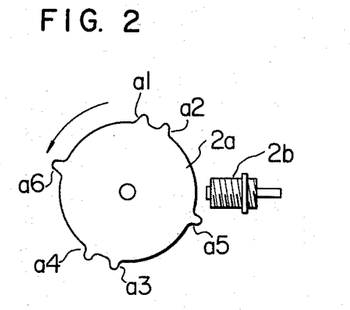
FIGS. 2 and 3 are front views showing respectively the crank angle measuring sensor and the cylinder discrimination sensor in the apparatus shown in FIG. 1.

Numeral 2 designates a crank angle measuring sensor which is constructed as shown in FIG. 2. In the Figure, numeral $2a$ designates an iron disk mounted on the crankshaft and having projections ($a_1$ to $a_6$) at six positions thereon such that the projection $a_1$ is disposed at a position of 10 degrees after the top dead center of the No. 1 and 4 cylinders, $a_2$ at a position of 30 degrees after the top dead center of the No. 1 and 4 cylinders, $a_3$ at a position of 10 degrees after the top dead center of the No. 3 and 2 cylinders, $a_4$ at a position of 30 degrees after the top dead center of the No. 3 and 2 cylinders, $a_5$ at a position of 110 degrees after the top dead center of the No. 1 and 4 cylinders and $a_6$ at a position of 110 degrees after the top dead center of the No. 3 and 2 cylinders. Numeral $2b$ designates an electromagnetic pickup of a known type which generates a signal when it is opposite to one of the projections on the disk $2a$.

Figure 3:
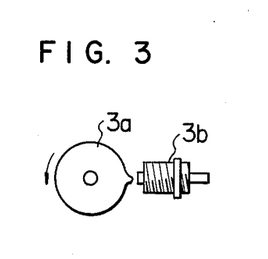
Figure 4:
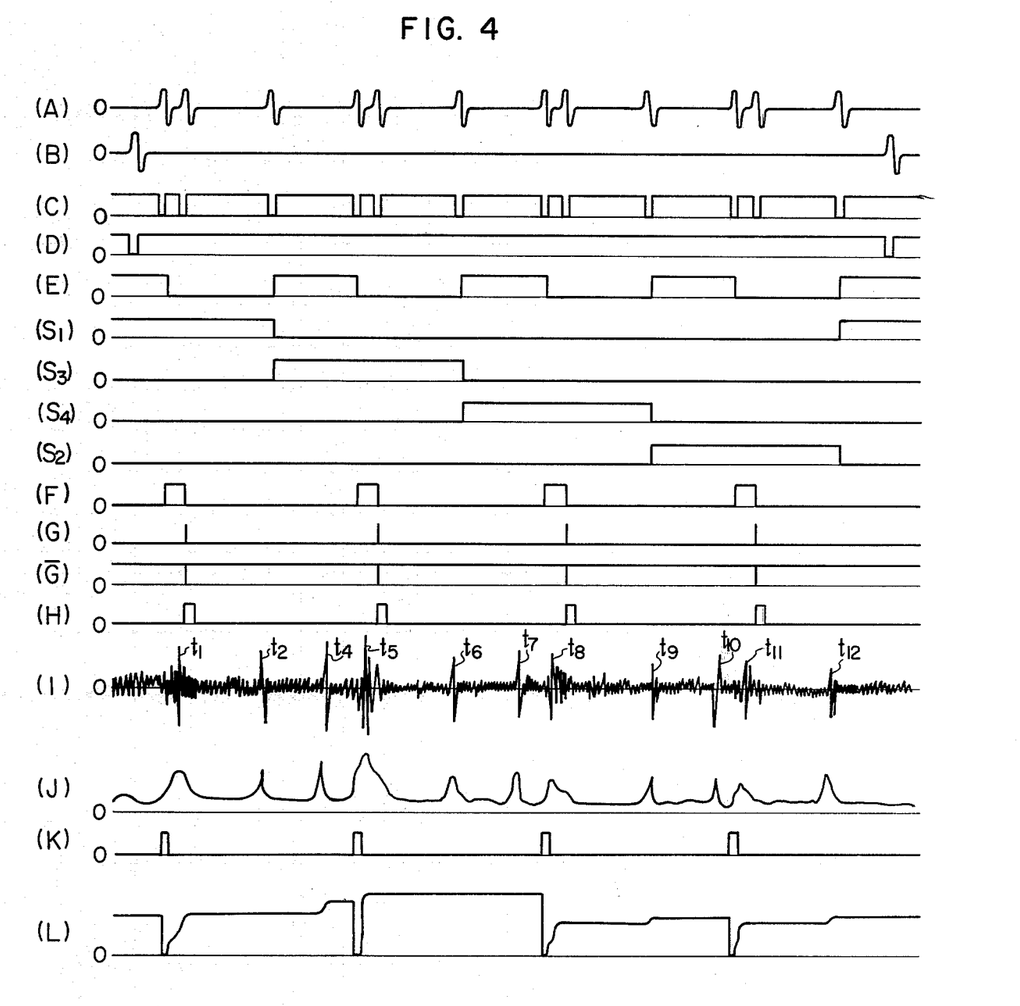
FIG. 4 shows a plurality of waveforms which are useful for explaining the operation of the apparatus shown in FIG. 1.

Numeral 3 designates a cylinder discrimination sensor which is constructed as shown in FIG. 3 and the sensor 3 is incorporated in the ignition system distributor. In the Figure, numeral $3a$ designates an iron disk formed with a projection at a position thereon, and $3b$ an electromagnetic pickup of the same type as the pickup $2b$ shown in FIG. 2 which generates a signal when it is positioned opposite to the projection on the disk $3a$. The position of the projection corresponds to about 20 degrees before the top dead center of the No. 1 cylinder. Numerals $4a$ to $4d$ designate amplifiers of the same circuit construction each thereof comprising a buffer and an amplifier, and they will not be described in detail since they are well known in the art. Numeral 5 designates a first waveform reshaping circuit for reshaping the output signal of the pickup $2b$. Referring to FIG. 4, (A) shows the output signals of the electromagnetic pickup $2b$, (B) the output signal of the electromagnetic pickup $3b$, and (C) the output signals of the first waveform reshaping circuit 5.

Figure 5:
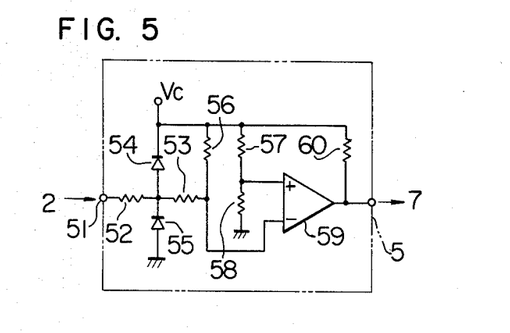
FIG. 5 is a circuit diagram showing the first waveform reshaping circuit used in the apparatus of FIG. 1.

FIG. 5 shows the internal circuitry of the first waveform reshaping circuit 5. In the Figure, numeral 51 designates an input terminal, and a resistor 52 has its one end connected to the input terminal 51 and its other end connected to a resistor 53, the anode of a diode 54 and the cathode of a diode 55 in common. The other end of the resistor 53 is connected to the inverting input terminal of a comparator 59 comprising the Motorola IC MC3302P, and the anode of the diode 55 is grounded. One end of a resistor 56 is connected to the cathode of the diode 54. A resistor 57 has its one end connected to the cathode of the diode 54 and its the other end connected to one end of a resistor 58 whose other end is grounded. The junction between the resistors 57 and 58 is connected to the noninverting input terminal of the comparator 59. The comparator 59 has an open-collector output and consequently a resistor 60 is connected between its output and a power supply $V_C$. The resistance values are selected such that the impedance seen looking into the resistors from the noninverting input terminal of the comparator 59 becomes equal to the impedance seen looking into the resistors from the comparator inverting input terminal. The noninverting input terminal of the comparator is at about $\frac{1}{3}$ $V_C$. As a result, if the electromagnetic pickup 2b is connected to the input terminal 51, a voltage of about $\frac{1}{3}$ $V_C$ will be applied to the input terminal of the comparator 59. The diode 55 is provided so that a negative voltage of less than −0.5 V is not applied to the inverting input terminal, and the diode 54 prevents the application of a positive voltage of over + ($V_C$+0.5 V) to the inverting input terminal. In operation, when the disk 2a is rotated, the waveform shown in (A) of FIG. 4 is generated each time the projections on the disk 2a successively pass the electromagnetic pickup 2b. When this occurs, the comparator 59 generates at its output the reshaped pulses shown in (C) of FIG. 4.

A second waveform reshaping circuit 6 is the same in circuit construction with the first waveform reshaping circuit 5 and will not be described. In operation, when the disk 3a is rotated so that the waveform shown in (B) of FIG. 4 is generated each time its projection passes the electromagnetic pickup 3b, the reshaped pulse in (D) of FIG. 4 is correspondingly generated at the output of the second waveform reshaping circuit 6.

Figure 6:
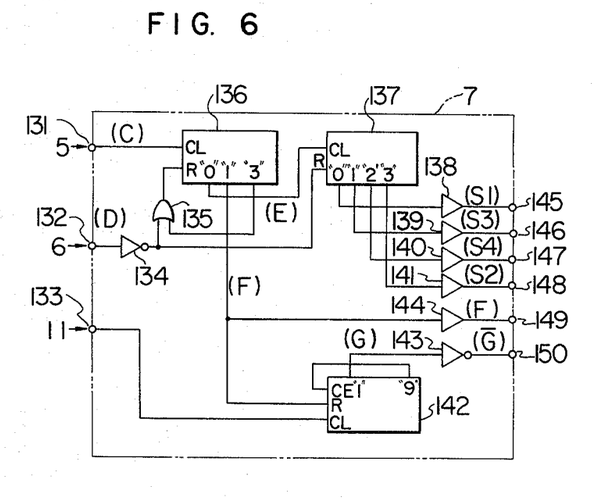
FIG. 6 is a circuit diagram showing the timing pulse generating circuit used in the apparatus of FIG. 1.

Numeral 7 designates a timing pulse generating circuit which is responsive to the output signals of the cylinder discriminator sensor 3 and the crank angle measuring sensor 2 to generate signals applied to the control inputs of analog switches 13a to 13d, a signal applied to the control input of a peak hold circuit 8 and a trigger signal applied to an A-D converter circuit 9 for A-D conversion starting purposes. Its internal circuitry is shown in FIG. 6. In the Figure, an input terminal 131 is connected to the output of the first waveform reshaping circuit 5, and an input terminal 132 is connected to the output of the second waveform reshaping circuit 6. An input terminal 133 is connected to receive the clocks $C_1$ (200 kHz) from a clock generating circuit 11. The input terminal 132 is also connected to one terminal of an OR gate 135 by way of an inverter 134. The other end of the OR gate 135 is connected to the "3" output terminal of a divider/counter 136. The output of the OR gate 135 is connected to the reset terminal R of the divider/counter 136. The clock input CL of the divider/counter 136 is connected to the input terminal 131. The divider/counter 136 also has its "0" output terminal connected to the clock input of a divider/counter 137 and its "1" connected to the reset terminal of a divider/counter 142. Each of the dividers/counters 136, 137 and 142 is comprised of the RCA IC CD4017. The divider/counter 137 has its "0" output terminal connected to the input of a buffer 138, its "1" output connected to the input of a buffer 139, its "2" output terminal connected to the input of a buffer 140 and its "3" output terminal connected to the input of a buffer 141. Each of the buffers 138, 139, 140 and 141 is comprised of the RCA IC CD4050. Each of the dividers/counters 136 and 137 has its clock enable terminal CE. The divider/counter 142 has its clock input CL connected to the input terminal 133 and its clock enable terminal connected to its "9" output terminal. The divider/counter 142 has its "1" output terminal connected to the input of an inverter 143. The buffers 138, 139, 140 and 141 are respectively connected to output terminals 145, 146, 147 and 148 of the timing pulse generating circuit 7. The divider/counter 136 has its "1" output terminal connected to an output terminal 149 through a buffer 144, and the inverter 143 is connected to an output terminal 150.

With the construction described above, the operation of the timing pulse generating circuit 7 is as follows. The pulse signal shown in (D) of FIG. 4 is applied to the input terminal 132. As a result, the inverted pulse of the pulse (D) is applied to the reset terminal R of the divider/counter 136 so that the divider/counter 136 is reset when the pulse (D) is at "0". When this occurs, the pulse shown in (C) of FIG. 4 are applied to the clock input of the divider/counter 136. Thus, in response to the positive-going transition of the third pulse a "1" is applied to the OR gate 135 so that the divider/counter 136 is reset and its "0" output terminal has the waveform shown in (E) of FIG. 4. Also the divider/counter 137 is reset when the pulse (D) is at "0" so that the waveform (E) is applied to the clock input of the divider/counter 137 which in turn generates the waveforms which are the same as those shown in ($S_1$), ($S_3$), ($S_4$) and ($S_2$) of FIG. 4 at its "0", "1", "2" and "3" output terminals, respectively. As a result, the outputs of the buffers 138, 139, 140 and 141 respectively become the waveforms shown in ($S_1$), ($S_3$), ($S_4$) and ($S_2$) of FIG. 4.

On the other hand, the waveform shown in (F) of FIG. 4 is generated at the "1" output of the divider/counter 136. As a result, the divider/counter 142 is reset when the pulse of the waveform (F) goes to "1" and it starts counting the clocks $C_1$ of 200 kHz when the pulse (F) goes from "1" to "0". When the ninth pulse is counted, a "1" is applied to the clock enable terminal so that the count is maintained until the divider/counter 142 is reset. As a result, when the pulse of the waveform (F) of FIG. 4 goes from "1" to "0", a narrow pulse of 10 μs shown in (G) of FIG. 4 is generated from the "1" output. This pulse is inverted by the inverter 143 and the resulting waveform shown in ($\overline{G}$) of FIG. 4 is generated at the output terminal 150 of the timing pulse generating circuit 7. The output of the buffer 144 becomes the waveform shown in (F) of FIG. 4.

The analog switches 13a to 13d are each so designed that it is turned on when its control input goes to "1" and it is turned off when the control input goes to "0". The output signals ($S_1$), ($S_2$), ($S_3$) and ($S_4$) of the timing pulse generating circuit 7 are respectively applied to the control input of the analog switches 13a to 13d, respectively. The analog switches 13a to 13d deliver their outputs to a common output line. The analog switch 13a is turned on when the signal ($S_1$) of FIG. 4 goes to "1" and it is turned off when the signal ($S_1$) goes to "0". The analog switch 13c is turned on when the signal ($S_3$) goes to "1" and it is turned off when the signal goes to "0". The analog switch 13d is turned on when the signal ($S_4$) goes to "1" and it is turned off when the signal ($S_4$) goes to "0". The analog switch 13b is turned on when the signal ($S_2$) goes to "1" and it is turned off when the signal goes to "0". As a result, the outputs of the analog switches 13a to 13d respectively correspond to the combustion pressure waveforms generated from the No. 1 cylinder during the interval between 110 degrees after TDC of the No. 2 cylinder and 110 degrees after TDC of the No. 1 cylinder, the combustion pressure waveform generated from the No. 3 cylinder during the interval between 110 degrees after TDC of the No. 1 cylinder and 110 degrees after TDC of the No. 3 cylinder, the combustion pressure waveform generated from the No. 4 cylinder during the interval between 110 degrees after TDC of the No. 3 cylinder and 110 degrees after TDC of the No. 4 cylinder and the combustion pressure waveform generated from the No. 2 cylinder during the interval between 110 degrees after TDC of the No. 4 cylinder and 110 degrees after TDC of the No. 2 cylinder. The reason for selecting the points of 110° after TDC of the respective cylinders as the switching points of the analog switches 13a to 13d is that while the switching at these switching points tends to generate and deliver high frequency noise to the following high-pass filter 14 and while the required waveforms will in fact be produced during the interval between 10° and 30° after TDC of the respective cylinders thus making it possible to select any points outside this interval as the required switching points, it is preferred to select points which are as remote from the interval as possible, thus resulting in the selection of the points of 110° after TDC of the respective cylinders.

The high-pass filter 14 is a high-pass active filter of over 5 kHz and it comprises the NF Circuit Block Design DV4BH with a capacitor being connected to each of its input and output.

Numeral 15 designates an AC amplifier having an amplification factor of about 100 times and it will not be described in detail since it is well known.

The output waveform of the AC amplifier 15 is shown in (I) of FIG. 4. In (I) of FIG. 4, $t_1$ represents the waveform produced on the power stroke of the No. 1 cylinder, $t_2$ the noise produced by the transition between the analog switches 13a and 13b, $t_4$ the ignition noise from the No. 3 cylinder, $t_5$ the waveform produced on the power stroke of the No. 3 cylinder, $t_6$ the noise produced by the transition between the analog switches 13c and 13d, $t_7$ the ignition noise from the No. 4 cylinder, $t_8$ the waveform produced on the power stroke of the No. 4 cylinder, $t_9$ the noise produced by the transition between the analog switches 13d and 13b, $t_{10}$ the ignition noise of the No. 2 cylinder, $t_{11}$ the waveform produced on the power stroke of the No. 2 cylinder, and $t_{12}$ the noise produced upon the transition between the analog switches 13b and 13a. The noise waveforms $t_2$, $t_6$, $t_9$ and $t_{12}$ include those produced by the opening of the intake and exhaust valves of the respective cylinders.

Numeral 16 designates an absolute value circuit having the circuit construction stated on page 163 of the "Operational Amplifier Handbook", published in 1976 by the Electronics Digest Ltd., but using different circuit constants and thus it will not be described in detail. In operation, the absolute value circuit 16 converts its negative input waveform to a positive waveform and it generates the waveform shown in (J) of FIG. 4.

Figure 7:
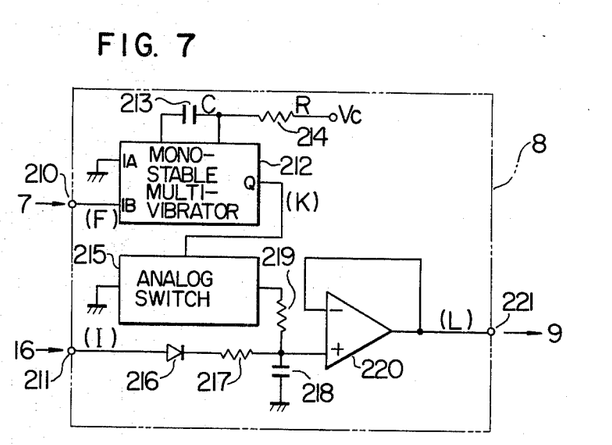
FIG. 7 is a circuit diagram showing the peak hold circuit used in the apparatus of FIG. 1.

Numeral 8 designates a peak hold circuit and its internal circuitry is shown in FIG. 7. An input terminal 210 receives the signal (F) from the timing pulse generating circuit 7, and the input terminal 210 is connected to the input 1B of a monostable multivibrator 212 comprising the Texas Instruments IC SN74123. The other input 1A is grounded. A capacitor 213 is connected between the terminals 14' and 15' of the monostable multivibrator 212 and a resistor 214 is connected between the terminal 15' and the power supply $V_C$ (=5V). Thus, a signal having a pulse width of about 100 μs as determined by the capacitor 213 and the resistor 214 is generated at the output Q as shown in (K) of FIG. 4 in response to the positive-going transition of the signal (F) from the timing pulse generating circuit 7. The output Q is connected to the control terminal of an analog switch 215. An input terminal 211 is connected to the absolute value circuit 16 and the input terminal 211 is also connected to the anode of a diode 216. The cathode of the diode 216 is connected to the noninverting input of a buffer amplifier 220 through a resistor 217. The analog switch 215 has its input connected to the noninverting input of the buffer amplifier 220 through a resistor 219 and its output grounded. A capacitor 218 is connected between the noninverting input of the buffer amplifier 220 and the ground. The inverting input of the buffer amplifier 220 is connected to its output. The output of the buffer amplifier 220 is also connected to an output terminal 221 of the peak hold circuit 8.

With the above-described construction, the operation of the peak hold circuit 8 is as follows. When the signal shown in (F) of FIG. 4 arrives at the input terminal 210 from the timing pulse generating circuit 7, the pulse shown in (K) of FIG. 4 is generated at the output of the monostable multivibrator 212. The analog switch 215 is closed for the time width of the pulse (K) so that the charge on the capacitor 218 is discharged through the resistor 219 and the voltage on the capacitor 218 is reset to 0 V. Then, the output (J) of the absolute value circuit 16 is charged into the capacitor 218 through the diode 216. As a result, the voltage on the capacitor 218 represents the peak value for the time interval between its successive resetting operations. The voltage on the capacitor 218 is applied to the input of the following high input impedance buffer amplifier 220. The waveform of its output becomes as shown in (L) of FIG. 4. The circuit 8 may be replaced with the peak value rectifier circuit shown on page 135 of the "Latest Practical Application Techniques of OP AMPs", published in February 1975 by the Seibundo Shinkosha, in Japan.

Numeral 9 designates an A-D converter comprising the micronetwork IC MN5120 8-bit A-D converter. When the output signal ($\overline{G}$) of the timing pulse generating circuit 7 is applied to the start-conversion terminal of the A-D converter 9, the A-D converter 9 starts its A-D conversion and the pulse shown in (H) of FIG. 4 is generated at its terminal EOC upon completion of the A-D conversion. The length of this inversion time is about 10 μs. In this case, since the signal in ($\overline{G}$) of FIG. 4 is the waveform generated at 30 degrees after TDC of each cylinder and since the voltage of the peak hold circuit 8 up to 10 μs from this waveform is subjected to A-D conversion, the resulting 8-bit binary code value from the A-D converter 9 represents the peak value of the signal waveform generated during the interval of 10 to 30 degrees after TDC of each of the cylinders. The EOC output and the 8-bit binary code output of the A-D converter 9 are respectively coupled to the interrupt terminal and the I/O terminals of a frequency rate computing circuit 10.

Figure 8:
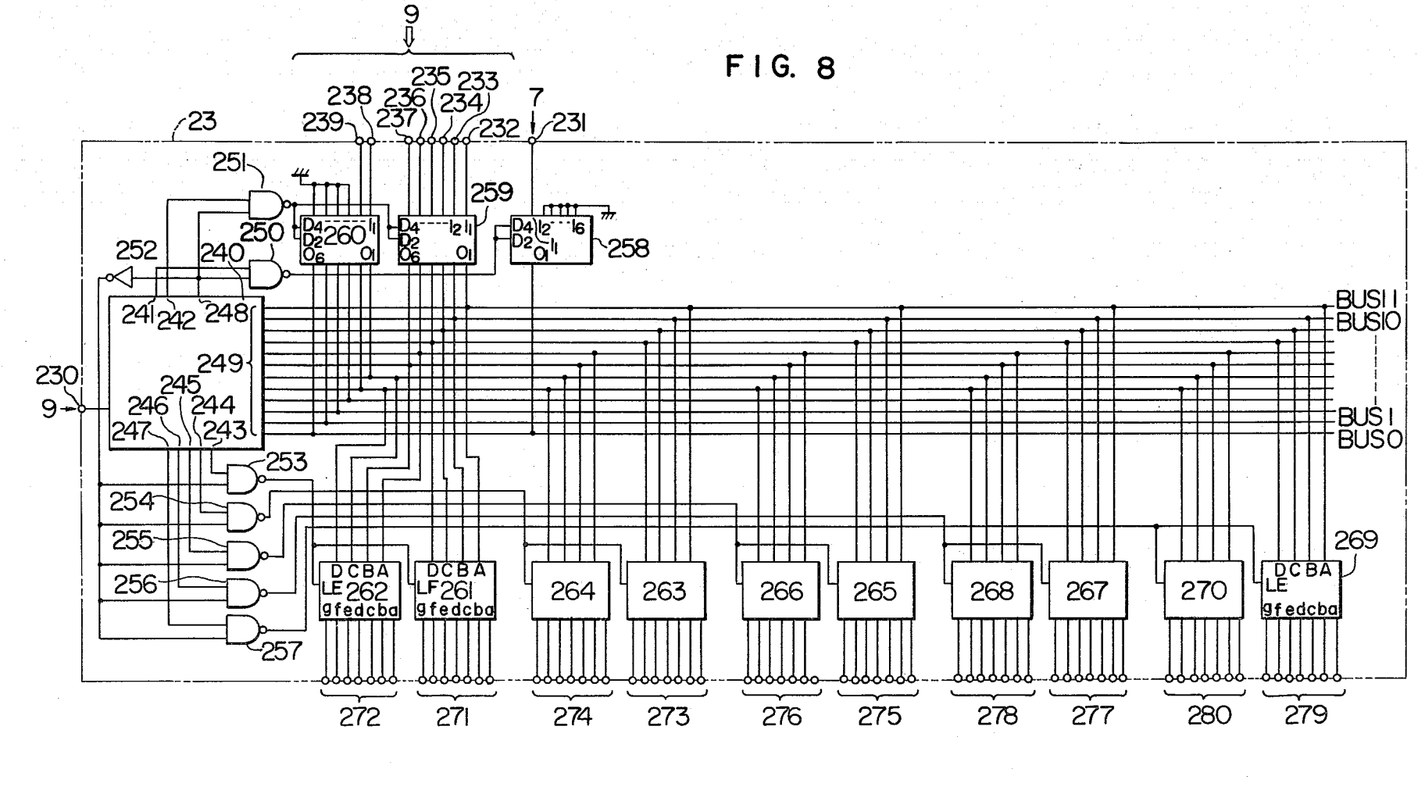
FIG. 8 is a circuit diagram showing the frequency rate computing circuit used in the apparatus of FIG. 1.

The frequency rate computing circuit 10 will now be described. FIG. 8 shows the internal circuitry of the frequency rate computing circuit 10. An input terminal 230 is connected to the output terminal EOC of the A-D converter 9. An input terminal 231 is connected to receive the output ($S_1$) of the timing pulse generating circuit 7, and input terminals 232, 233, 234, 235, 236, 237, 238 and 239 are connected to receive the 8-bit binary code output of the A-D converter 9 in the order of their significance with the input terminal 231 receiving the least significant bit. Numeral 240 designates a microcomputer comprising the Toshiba TLCS-12. Although the circuit construction and operation of the microcomputer 240 are well known and will not be described, it utilizes the internal clock frequency (2 MHz) such that when it is energized, it is initialized and brought into operation starting at the designated address of its ROM. The microcomputer 240 includes eight interrupt signal lines one of which is connected to the input terminal 230. Terminals 242, 243, 244, 245, 246 and 247 are respectively connected to signal lines $SE_0$, $SE_1$, $SE_2$, $SE_3$, $SE_4$ and $SE_5$ which are six of the sixteen device address select signal lines of an input/output control unit (hereinafter referred to as a DCU) which is incorporated in the microcomputer 240, thereby connecting the devices to the bus lines. A terminal 241 is connected to one input terminal of a NAND gate 251, and the terminals 242, 243, 244, 245, 246 and 247 are respectively connected to one input terminal of NAND gates 251, 253, 254, 255, 256, and 257, respectively.

A terminal 248 is connected to the input/output command line of the DCU so that data are transferred from the devices to the processor (hereinafter referred to as a CPU) in the microprocessor 240 when the terminal 248 goes to "1" and data are transferred to the devices from the CPU when the terminal 248 goes to "0". The terminal 248 is connected to the other input terminal of the NAND gates 250 and 251, respectively, and also to the other input terminal of the NAND gates 253, 254, 255, 256 and 257, respectively, through an inverter 252.

Numeral 249 designates a 12-bit bus line group including twelve lines $BUS_0$ to $BUS_{11}$. The $BUS_{11}$ is the least significant bit line and the $BUS_0$ is the most significant bit line. Numeral 258 designates a buffer circuit comprising a noninverting buffer circuit with 3-state output and the Toshiba TC5012P is used for this circuit. Its input $I_1$ is connected to the input terminal 231 of the frequency rate computing circuit 10, and disable terminals $D_4$ and $D_2$ are both connected to the output of the NAND gate 250. Its output $O_1$ is connected to the bus line $BUS_0$. Numeral 259 designates a circuit which is identical with the buffer circuit 258 and whose inputs $I_1$, $I_2$, $I_3$, $I_4$, $I_5$ and $I_6$ are respectively connected to the input terminals 232, 233, 234, 235, 236 and 237 of the frequency rate computing circuit 10. Its disable terminals $D_4$ and $D_2$ are both connected to the output of the NAND gate 251. Its outputs $O_1$, $O_2$, $O_3$, $O_4$, $O_5$ and $O_6$ are respectively connected to the bus lines $BUS_{11}$, $BUS_{10}$, $BUS_9$, $BUS_8$, $BUS_7$ and $BUS_6$.

Numeral 260 designates a circuit comprising the same TC5012P as the buffer circuit 258. Its inputs $I_1$ and $I_2$ are respectively connected to the input terminals 238 and 239 of the frequency rate computing circuit 10. The remaining inputs $I_3$, $I_4$, $I_5$ and $I_6$ are grounded in common. Its disable terminals $D_4$ and $D_2$ are connected in common to the output of the NAND gate 251. Its outputs $O_1$, $O_2$, $O_3$, $O_4$, $O_5$ and $O_6$ are respectively connected to the bus lines $BUS_5$, $BUS_4$, $BUS_3$, $BUS_2$, $BUS_1$ and $BUS_0$.

Numerals 261, 262, 263, 264, 265, 266, 267, 268, 269 and 270 designate memories each adapted to function as a decoder for converting a BCD input to a 7-segment indicator unit drive signal and a driver and the TOSHIBA IC TC4511BP is used for each of the memories. The latch enable input terminals LE of the memories 261 and 262 are connected to the output of the NAND gate 253, those of the memories 263 and 264 to the output of the NAND gate 254, those of the memories 265 and 266 to the output of the NAND gate 255, those of the memories 267 and 268 to the output of the NAND gate 256, and those of the memories 269 and 270 to the output of the NAND gate 257. The memories 261 and 262 form a pair for the No. 1 cylinder, and the memory 261 corresponding to the units digit has its inputs A, B, C and D respectively connected to the bus lines $BUS_{11}$, $BUS_{10}$, $BUS_9$ and $BUS_8$. The memory 262 corresponds to the tens digit and its inputs A, B, C and D are respectively connected to the bus lines $BUS_7$, $BUS_6$, $BUS_5$ and $BUS_4$. In the like manner, the memories 263 and 264 form a pair for the No. 3 cylinder, and the memory 263 corresponding to the units digit has its inputs A, B, C and D respectively connected to the bus lines $BUS_{11}$ to $BUS_8$. The memory 264 corresponds to the tens digit and its inputs A, B, C and D are respectively connected to the bus lines $BUS_7$ to $BUS_4$. The memories 265 and 266 form a pair for the No. 4 cylinder, and the memory 265 corresponding to the units digit has its inputs A, B, C and D respectively connected to the bus lines $BUS_{11}$ to $BUS_8$. The memory 266 corresponds to the tens digit and its inputs A, B, C and D are respectively connected to the bus lines $BUS_7$ to $BUS_4$. The memories 267 and 268 form a pair for the No. 2 cylinder, and the memory 267 corresponding to the units digit has its inputs A, B, C and D respectively connected to the bus lines $BUS_{11}$ to $BUS_8$. The memory 268 corresponds to the tens digit and its inputs A, B, C and D are respectively connected to the bus lines $BUS_7$ to $BUS_4$. The memories 269 and 270 form an all-cylinder pair, and the memory 269 corresponding to the units digit has its inputs A, B, C and D respectively connected to the bus lines $BUS_{11}$ to $BUS_8$. The memory 270 corresponds to the tens digit and its inputs A, B, C and D are respectively connected to the bus lines $BUS_7$ to $BUS_4$. The memories 261, 262, 263, 264, 265, 266, 267, 268, 269 and 270 are respectively connected to the indicator circuit 12 through the output terminals 271, 272, 273, 274, 275, 276, 277, 278, 279 and 280 of the frequency rate computing circuit 10.

Figure 9:
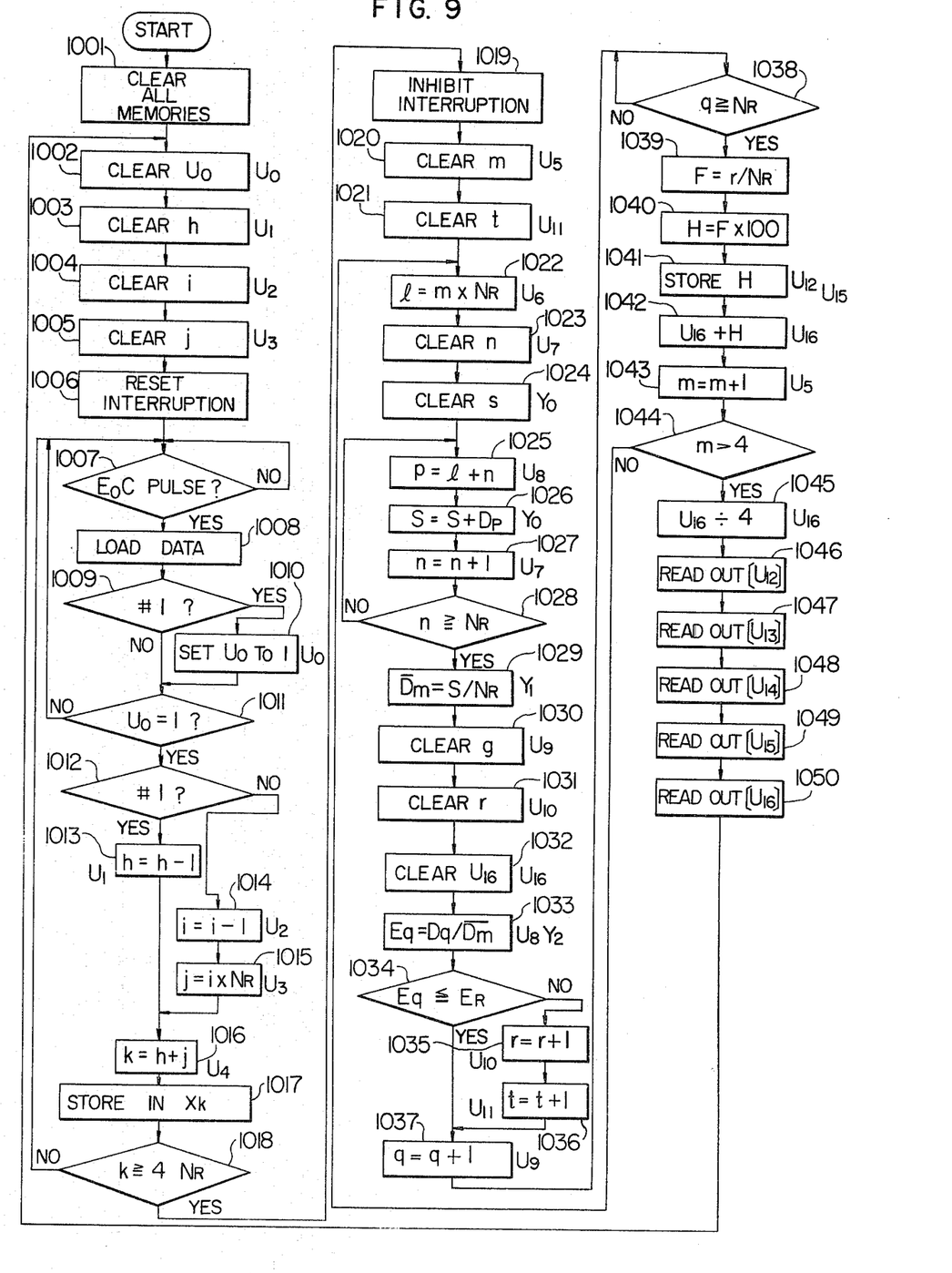
FIG. 9 is a flowchart for the microcomputer in the circuit shown in FIG. 8.

With the construction described above, the operation of the frequency rate computing circuit 10 will now be described with reference to the flowchart shown in FIG. 9. When the key switch (not shown) is turned on, the circuit is energized and it starts operating. A step 1001 clears all the memories in the microcomputer 240 except the ROM. A step 1002 clears a location $U_0$ of a memory area U in the RAM, and a step 1003 clears a location $U_1$ to set its content h to 0. A step 1004 clears a location $U_2$ to set its content i to 0, and a step 1005 clears a location $U_3$ to set its content j to 0. A step 1006 sets a master mask and executes a swap command to permit the application of an interrupt request signal. Then, when the engine is started and comes into operation, the A-D converter 9 initiates its A-D conversion in response to the pulse shown in (G) of FIG. 4 and applied from the timing pulse generating circuit 7. When this conversion is completed, the EOC pulse shown in (H) of FIG. 4 is generated so that the microcomputer 240 is interrupted through the input terminal 230 of the frequency rate computing circuit 10 causing the microcomputer 240 to start computing. This is done by a step 1007. If there is no EOC pulse, the arrival of it is waited upon. When the EOC pulse is applied, the control is transferred to a step 1008. The step 1008 is such that a device address select signal $SE_0$ is generated at the terminal 241 after the input/output command signal has been changed to "1" by the device control unit (DCU) in the microcomputer 240. When both the input/output command signal and the device address select signal go to "1", the output of the NAND gate 250 goes to "0" so that the input and the output of the buffer circuit 258 are interconnected and the data appearing on the bus lines is loaded into the register of the processor in the microcomputer 240. A step 1009 determines whether only the most significant bit of the 12-bit data stored in the register of the processor is "1" or "0". If it is, or "yes", the control is transferred to a step 1010, and if it is not or "no", the control is transferred to a step 1011. The step 1010 sets the location $U_0$ of the memory area U to 1 and then the control is transferred to the step 1011. The step 1011 determines whether the content of the memory location $U_0$ is 1, so that if it is, or "yes", the control is transferred to a step 1012, whereas if it is not, or "no", the control is returned to the step 1007. Once the memory location $U_0$ is set to 1, the control will be passed unconditionally up to the step 1012 until the location $U_0$ is reset, and the steps 1008, 1009, 1010 and 1011 are such that the data are successively stored in the memory starting with the data of the No. 1 cylinder. The step 1012 is the process including the steps 1008 and 1009 and it determines by the same processes as the steps 1008 and 1009 whether the data just entered is the data of the No. 1 cylinder. If it is, the control is transferred to a step 1013, and if it is not, the control is transferred to a step 1014.

The step 1013 increases the content h of the memory location $U_1$ by 1 and stores it again in the memory location $U_1$. Then, the location $U_2$ is cleared to set its content i to 0. As a result, initially 0+1 or 1 is stored. In the like manner, the step 1014 increases the content i of the memory location $U_2$ by 1 and then stores it again in the location $U_2$. Thus, since initially i=0, 0+1 or 1 is stored. A step 1015 multiplies the content i of the memory location $U_2$ by a preset frequency $N_R$ (=100) preliminarily programmed into the ROM and stores the result in the memory location $U_3$.

A step 1016 adds the content h of the location $U_1$ to the content j of the location $U_3$ and stores the resulting sum in the location $U_4$. A step 1017 is such that the data introduced from the inputs 232 to 239 of the frequency rate computing circuit 10 is stored in an address or location $X_k$ of a memory area X designated by the content of the location $U_4$. A step 1018 determines whether the content k of the location $U_4$ is greater than $4 \times N_R$. If it is not, the control is returned to the step 1007. If it is, the control is transferred to a step 1019. By the processing of the steps 1007 to 1018, assuming that the preset frequency $N_R$ is 100, of the data subjected to the A-D convertion the data of the No. 1 cylinder are stored in the locations $X_1$ to $X_{100}$, the data of the No. 3 cylinder are stored in the locations $X_{101}$ to $X_{200}$, the data of the No. 4 cylinder are stored in the locations $X_{201}$ to $X_{300}$ and the data of the No. 2 cylinder are stored in the locations $X_{301}$ to $X_{400}$, each in regular succession.

The step 1019 resets the master mask and then executes the swap command to inhibit interruptions. A step 1020 clears a location $U_5$ to set its content m to 0, and a step 1021 clears a location $U_{11}$ to set its content t to 0. A step 1022 multiplies the content m of the location $U_5$ by the preset frequency $N_R$ preprogrammed into the ROM and stores the result in a location $U_6$. A step 1023 sets the content n of a location $U_7$ to 1. A step 1024 sets the content S of a location $Y_0$ of a memory area Y to 0. A step 1025 adds the content n of the location $U_7$ to the content l of the location $U_6$ and stores the sum in a location $U_8$. Thus, since initially m=0 and n=1, there results p=1. A step 1026 is such that the content $D_P$ in a location $X_p$ of the memory area X which was designated by the content p of the location $U_8$ is added to the content S of the location $Y_0$ in the memory area Y and the result is stored in the location $Y_0$. A step 1027 increases the content n of the location $U_7$ by 1 and stores the result in the location $U_7$. A step 1028 determines whether the content n of the location $U_7$ is greater than the preset frequency $N_R$ so that if it is, the control is transferred to a step 1029. If it is not, the control is returned to the step 1025. As a result, if now m=0 and $N_R=100$, the processing of the steps 1023 to 1028 has entered the data $D_1+D_2+\ldots+D_{100}$ of the No. 1 cylinder as the content S of the location $Y_0$.

A step 1029 divides the content S of the location $Y_0$ by the preset frequency $N_R$ and the resulting quotient value $\overline{D}_m$ is stored in a location $Y_1$. The value $\overline{D}_m$ represents the average value. A step 1030 sets the contents q of a location $U_9$ to 1. A step 1031 clears a location $U_{10}$ and sets its content r to 0. A step 1032 clears a location $U_{16}$ and sets its content to 0. A step 1033 divides the data $D_q$ of a location $X_q$ designated by the content q of the location $U_9$ by the content $\overline{D}_m$ of the location $Y_1$ and stores the resulting quotient value $E_q$ in a location $Y_2$.

A step 1034 determines whether the content $E_q$ of the location $Y_2$ is smaller than a preset value $E_R$ preprogrammed into the ROM. If it is, the control is transferred to a step 1037. If it is not, the control is transferred to a step 1035. The step 1035 increases the content r of the location $U_{10}$ by 1 and stores it in the location $U_{10}$. Thus, initially r=0. The step 1036 increases the content t of the location $U_{11}$ by 1 and stores it in the location $U_{11}$. The steps 1035 and 1036 differ from each other in that while the location $U_{10}$ is cleared for each of the cylinders, the location $U_{11}$ is cleared after the completion of the processing on all the cylinders.

A step 1037 increases the content q of the location $U_9$ by 1 and stores it again in the location $U_9$. Thus, the values of the content q are such that initially it is set to q=1 and then increased to 2, 3, . . . A step 1038 determines whether the content q of the location $U_9$ is greater than the preset frequency $N_R$. If it is, the control is transferred to step 1039. If it is not, the control is returned to step 1033. Thus, by the processing of the steps 1031 to 1038, the data $D_1, D_2, \ldots, D_{nR}$ stored in the locations $X_1, X_2, \ldots, X_{nR}$ are each divided by the average value $\overline{D}_m$ so that the number of those of the resulting quotients $E_1, E_2, \ldots, E_{nR}$ which are greater than the preset value $E_R$ is stored as the content r of the location $U_{10}$.

The step 1039 is such that the content r of the location $U_{10}$ is stored in a register $R_2$ which is one of the eight general registers in the processor and then the preset frequency $N_R$ is read from the ROM thus dividing the content r by the frequency $N_R$. The resulting quotient F is held in the registers $R_2$ and $R_3$. A step 1040 reads the number 100 from the ROM and multiplies the contents of the registers $R_2$ and $R_3$ by 100. The resulting product H represents the frequency rate and it is held in the registers $R_2$ and $R_3$. The register $R_2$ retains the higher significant digit and the register $R_3$ retains the lower significant digit.

A step 1041 is such that the frequency rate H in the register $R_3$ is stored in a location $U_a$ ($U_{12}$, $U_{13}$, $U_{14}$, $U_{15}$) whose address is identical with a value obtained by adding a constant a to the content m of the location $U_5$. The location $U_{12}$ corresponds to the case of m=O. A step 1042 adds the computed frequency rate H to the content of the location $U_{16}$ and stores the result in the location $U_{16}$. Since the content of the location $U_{16}$ is initially O, the frequency rate H of the No. 1 cylinder is stored. A step 1043 increases the content m of the location $U_5$ by 1 and stores it in the location $U_5$. A step 1044 determines whether the content m of the location $U_5$ is greater than 4. If it is not, the control is returned to the step 1022. If it is, the control is transferred to a step 1045. Thus, with the preset frequency $N_R$ being 100, the steps 1020 to 1044 perform the process of obtaining the data $D_1$, $D_2$, ..., $D_{100}$ of the No 1 cylinder, obtaining the average vaule $\overline{D}_O$ of these data, dividing each of the data by the average value $\overline{D}_o$ to obtain their relative magnitudes, and then storing the resulting rate as a frequency rate in the location $U_{12}$. Then, similarly the data $D_{101}$, $D_{102}$, ..., $D_{200}$ of the No. 3 cylinder are obtained, their average value $\overline{D}_1$ is obtained, the data are each divided by the average value $\overline{D}_1$ to determine their relative magnitudes, and then the resulting rate is stored as a frequency rate in the location $U_{13}$. In the like manner, the data $D_{201}$, $D_{202}$, ..., $D_{300}$ of the No. 4 cylinder are obtained, the average value $\overline{D}_2$ of these data is obtained, each of these data is divided by the average value $\overline{D}_2$ to determine their relative magnitudes, and then the resulting rate is stored as a frequency rate in the location $U_{14}$.

Also the data $D_{301}$, $D_{302}$, ..., $D_{400}$ of the No. 2 cylinder are obtained and the resulting rate is stored as a frequency rate in the location $U_{15}$.

The step 1045 divides the value stored in the location $U_{16}$ by 4 and stores the resulting value in the location $U_{16}$. A step 1046 delivers the content of the location $U_{12}$ onto the bus lines and latches the same in the memories 261 and 262. A step 1047 delivers the content of the location $U_{13}$ onto the bus lines and latches the same in the memories 263 and 264. A step 1048 delivers the content of the location $U_{14}$ onto the bus lines and latches the same in the memories 265 and 266. A step 1049 delivers the content of the location $U_{15}$ onto the bus lines and latches the same in the memories 267 and 268. A step 1050 delivers the content of the location $U_{16}$ onto the bus lines and latches the same in the memories 269 and 270. In this case, an input/output command signal is generated from the terminal 248 and it goes to "0". Almost simultaneously a device address select signal $SE_2$ is generated from the terminal 243 and it goes to "1". Almost simultaneously the content of the location $U_{12}$ is delivered onto the I/O bus lines. When the input-/output command signal and the device address select signal satisfy the above-mentioned condition, the inverter 252 and the NAND gate 253 generate a signal which goes from "1" to "0" and in response to this signal the memories 261 and 262 store the desired data or the eight lower significant bits of the data delivered onto the I/O bus lines.

In the like manner, the data delivered onto the I/O bus lines is stored in the memories 263 and 264 when the output of the NAND gate 254 goes from "1" to "0". Likewise, the data delivered onto the I/O bus lines is stored in the memories 265 and 266 when the output of the NAND gate 255 goes from "1" to "0". Also, the data delivered onto the I/O bus lines is stored similarly in the memories 267 and 268 when the output of the NAND gate 265 goes from "1" to "0". In the like manner, the data delivered onto the I/O bus lines is stored in the memories 269 and 270 when the output of the NAND gate 257 goes from "1" to "0". When the step 1050 is completed, the control is returned to the step 1002. With the flowchart of FIG. 9, in the case of a determination such as the one performed by the step 1007 the operation may involve more detailed steps and such steps may also be involved in cases where the control is returned to any previous step. However, these detailed steps are well known in the art and will not be described.

Figure 10:
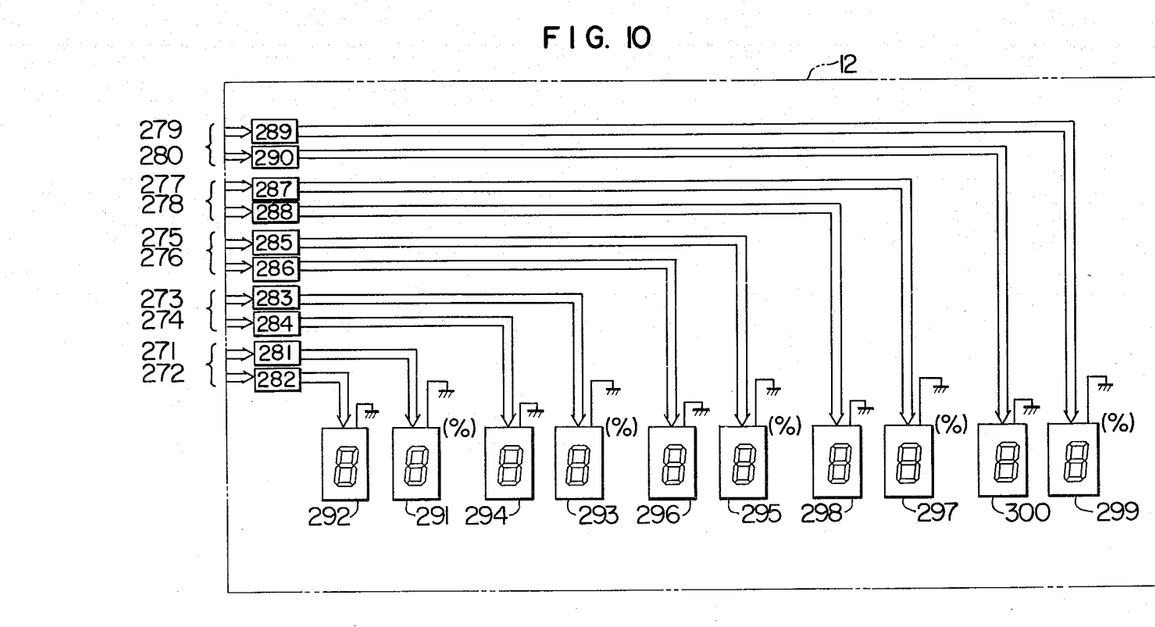
FIG. 10 is a circuit diagram showing an embodiment of the indication circuit in the apparatus shown in FIG. 1.
Figure 11:
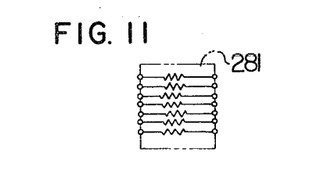
FIG. 11 is an internal circuit diagram of the resistor group in the indicator circuit shown in FIG. 10.

FIG. 10 shows the circuit construction of the indicator circuit 12. In the Figure, the output terminals 271 of the frequency rate computing circuit 10 are connected to the anode of a light-emitting diode or LED 291 through a resistor group 281 arranged as shown in FIG. 11. In the like manner, the output terminals 272 are connected to the anode of an LED 292 through a resistor group 282, the output terminals 273 to the anode of an LED 293 through a resistor group 283, the output terminals 274 to the anode of an LED 294 through a resistor group 284, the output terminals 275 to the anode of an LED 295 through a resistor group 285, the output terminals 276 to the anode of an LED 296 through a resistor group 286, the output terminals 277 to the anode of an LED 297 through a resistor group 287, the output terminals 278 to the anode of an LED 298 through a resistor group 288, the output terminal 279 to the anode of an LED 299 through a resistor group 289, and the output terminals 280 to the anode of an LED 300 through a resistor group 290.

Each of the LEDs 291 to 300 comprises the TOSHIBA TLR 312 of the seven segment type and the cathodes of the LEDs are grounded.

With the construction described above, the operation of the indicator circuit 12 is as follows. Since each of the memories 261 to 270 of the frequency rate computing circuit 10 is designed to function as a decoder/driver which converts a BCD input to a seven-segment-indication signal, the memories 261 to 270 can respectively drive the LEDs 291 to 300 through the resistors. Thus, the LEDs 292 and 291 indicate the frequency rate of the No. 1 cylinder in the range of 0 to 99%, and the LEDs 294 and 293 indicate the frequency rate of the No. 3 cylinder. The LEDs 296 and 295 indicate the frequency rate of the No. 4 cylinder, and the LEDs 298 and 297 indicate the frequency rate of the No. 2 cylinder. The LEDs 300 and 299 indicate the frequency rate of all the cylinders or the average value of the frequency rates of the respective cylinders.

The clock generating circuit 11 will now be described. The clock generating circuit 11 comprises an oscillator with a crystal unit and a counter for dividing the frequency of the oscillator. Its circuit construction and details are well known in the art and will not be described.

The other ±15 V power supply for operational amplifiers, power supply $V_C=5$ V, microcomputer power supply circuit and offset regulating circuit for operational amplifiers are well known in the art and will not be described.

Figure 12:
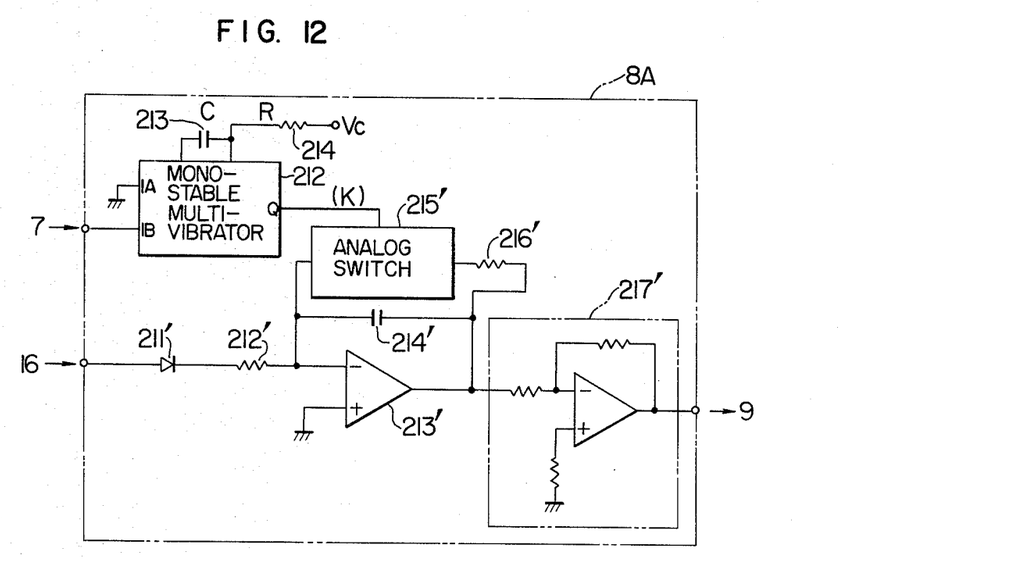
FIG. 12 is a circuit diagram showing an embodiment of an integrator circuit used in place of the peak hold circuit in the apparatus shown in FIG. 1.

While, in the embodiment described above, the peak hold circuit 8 and the A-D converter 9 are used for detecting the peak value of the waveform generated in the interval of 10 to 30 degrees after TDC, the presence of knock can also be determined by replacing the peak hold circuit 8 with an integrator circuit 8A constructed as shown in FIG. 12 for the purpose of obtaining an integrated value of the waveform produced in the same interval of 10 to 30 degrees after TDC. In FIG. 12, numeral 211' designates a diode for passing only the positive components of the waveform. An integrator is formed by a resistor 212', an amplifier 213', a capacitor 214', an analog switch 215' and a resistor 216'. Numerals 212, 213 and 214 designate an IC forming a monostable multivibrator, a capacitor and a resistor which are the same with those shown in FIG. 7, and they are responsive to the positive-going edge of the signal (F) from the timing pulse generating circuit 7 to generate the output of about 100 μs shown in (K) of FIG. 4. The analog switch 215' is closed by the pulse (K) of FIG. 4 which is applied to its control input so that the charge on the capacitor 214' is discharged so as to start an integration action. In this case, since the input to the integrator is a positive voltage is generated. This integration action is started at about 10 degrees after TDC so that after the integration has been completed, at 30 degrees after TDC the voltage is subjected to A-D conversion by the A-D converter 9 at a rate of about 10 μsec and thus the resulting converted value represents an integrated value of the waveform generated during the interval between 10° and 30° after TDC. If the engine is knocking, this integrated value increases with the intensity of the knock. Thus, by processing this integrated value by the frequency rate computing circuit 10 in the same manner as mentioned previously and then indicating the result by the indicator circuit 12, it was possible to obtain practically the same results as obtained previously.

Further, while, in the embodiment described above, the sampling period is the interval between 10° and 30° after TDC, it is possible to effect the desired knock discrimination by selecting a predetermined period of time after each ignition or a predetermined degrees of crankshaft rotation after each ignition as the desired sampling period.

Still further, while, in the above-described embodiment, the vibrations, induced by the combustion pressures in the respective cylinders are detected, a vibration sensor may be mounted on a portion of the engine such that the mechanical vibration accelerations of the cylinder block are detected and the vibration waveforms are applied to the amplifier circuit 15 of FIG. 1, thus storing in the memory of the frequency rate computing circuit the data corresponding to the vibration waveforms associated with the respective cylinders. Thus, with this vibration sensor, it is possible to accomplish the knock discrimination in the like manner as the embodiment of this invention.

Also, it should be apparent that the detecting apparatus of this invention is equally applicable not only to spark ignition engines but also to Diesel engines, etc.

We claim:

1. A knock detecting apparatus for an internal combustion engine having a plurality of cylinders, comprising:

vibration detecting means for detecting vibrations produced by a combustion event in each of the cylinders of said engine to generate an analog output corresponding to said vibrations, a peak value of said analog output being detected by sample-and-holding;

a sampling A-D converter circuit whereby a peak value of an analog vibration output generated from said vibration detecting means during a predetermined period near the top dead center of each said cylinder is extracted and converted to a digital quantity;

a frequency rate computing circuit for storing said digital quantity output from said sampling A-D converter circuit a predetermined number of times for each of said cylinders, producing an average value of said output data stored for each of said cylinders and determining a proportion of those of said stored data of each said cylinder which are greater than said average value by predetermined times to obtain an individual-cylinder frequency rate, said frequency rate computing circuit further producing an average value of said individual-cylinder frequency rates by the number of said cylinders to obtain an all-cylinder frequency rate; and an indicator circuit for indicating an output of said frequency rate computing circuit representing said individual-cylinder frequency rate or said all-cylinder frequency rate.

2. An apparatus according to claim 1, wherein said vibration detecting means includes detecting means for detecting mechanical vibration acceleration of said engine and generating analog outputs corresponding to said vibration accelerations.

* * * * *